United States Patent [19]

Löser et al.

[11] 4,296,978
[45] Oct. 27, 1981

[54] SLIDING BEARING

[75] Inventors: Norbert Löser; Leopold Tilgner, both of Heusweiler, Fed. Rep. of Germany

[73] Assignee: SKF Kugellagerfabriken GmbH, Schweinfurt, Fed. Rep. of Germany

[21] Appl. No.: 101,647

[22] Filed: Dec. 10, 1979

[30] Foreign Application Priority Data

Dec. 21, 1978 [DE] Fed. Rep. of Germany ....... 7837851

[51] Int. Cl.³ .............................................. F16C 17/10
[52] U.S. Cl. ...................................... 308/37; 308/135
[58] Field of Search ...................... 308/37, 135, 72, 18, 308/23, 161, 167

[56] References Cited

U.S. PATENT DOCUMENTS

| | | | |
|---|---|---|---|
| 3,578,828 | 5/1971 | Orkin et al. | 308/135 |
| 4,190,302 | 2/1980 | Lynn et al. | 308/72 |
| 4,243,192 | 1/1981 | Johnson | 308/72 |

FOREIGN PATENT DOCUMENTS 2505732 9/1975 Fed. Rep. of Germany .

*Primary Examiner*—Lenard A. Footland
*Attorney, Agent, or Firm*—Daniel M. Rosen; J. David Dainow

[57] ABSTRACT

A sliding bearing for transmitting radial and axial forces, having an inner and an outer bushing, one of the bushings being provided on both faces thereof with flanges projecting radially against the other bushing, which flanges at least partially embrace the faces of the other bushing thus fixing the other bushing therebetween, and a sliding annular insert having a U-shaped cross-section of antifriction material arranged between said bushings, and having annular projections extending axially outward to embrace the flanges on the associated bushing.

6 Claims, 6 Drawing Figures

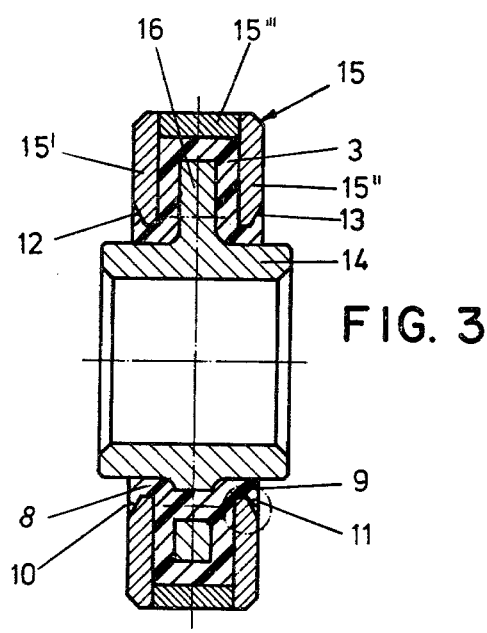
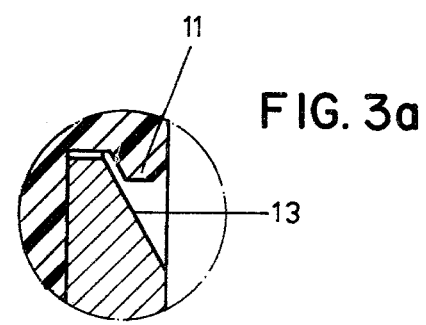

SLIDING BEARING

BACKGROUND OF THE INVENTION

This invention relates to sliding bearings, and particularly to a sliding bearing, ready for installation, to transmit radial and axial forces. Bearings of this type conventionally include an inner and an outer bushing, one of the bushings being provided on both faces with flanges or the like projecting radially against the other bushing, which flanges at least partially embrace the faces of the other bushing and thus fix the other bushing between them.

DESCRIPTION OF THE PRIOR ART

Such a bearing has been disclosed for example by German Design Pat. No. 1,721,969. In this known bearing, axial thrust rings are fixed to both ends of the cylindrical inner bushing by an elastic material, as for example rubber, fixing the disc-shaped outer bushing between them. Aside from the fact that in this known design, metal surfaces are in friction with each other, the attachment of the loose axial washers to the cylindrical inner bushing gives rise to difficulties because it requires a bonding or vulcanizing operation.

In German Patent Application DE-OS No. 2,505,732, based upon U.S. Ser. No. 452,359, filed Mar. 18, 1974, in FIG. 8, there is shown a split bushing employing a non-metal insert which separates a metal inner and outer bushing. However, the insert leaves the edge portion of the bushing separation without support, and maintains the inner and outer bushing together without a positive mechanical interlock.

It is therefore the object of this invention to provide a sliding bearing in which metal-to-metal contact between the two bushings is avoided and which can be simply and economically manufactured and assembled into a secure readymade prefabricated unit.

SUMMARY OF THE INVENTION

The foregoing object is accomplished by providing a sliding insert of friction-reducing material between the two bushings separating the metal parts from each other, thereby cutting down friction. By virtue of the U-shaped cross-section of the insert, it can be made in one piece, and furthermore no additional fastening means are required. This slide insert can be formed around the substantially T-shaped bushing by casting or injection molding, the material entering axial apertures or the like in the web of the said bushing and thus securing the insert in circumferential direction as well, and preventing co-rotation. Greater security of support is achieved by segmenting one of the bushings, the segments or parts held together by rims provided on annular projections of the insert which extend axially outward of the insert to mechanically secure the segments.

DESCRIPTION OF THE DRAWINGS

The foregoing summary will become more apparent from the following more detailed description and appended drawings, wherein:

FIG. 3 shows a cross-section of a bearing in which the outer bushing is U-shaped and multipartite;

FIG. 3a is an enlarged section of the portion of the bearing of FIG. 3 within the circle III.

In all three figures, an inset shows the retaining projections to a larger scale.

DETAILED DESCRIPTION OF THE INVENTION

Figure 1:
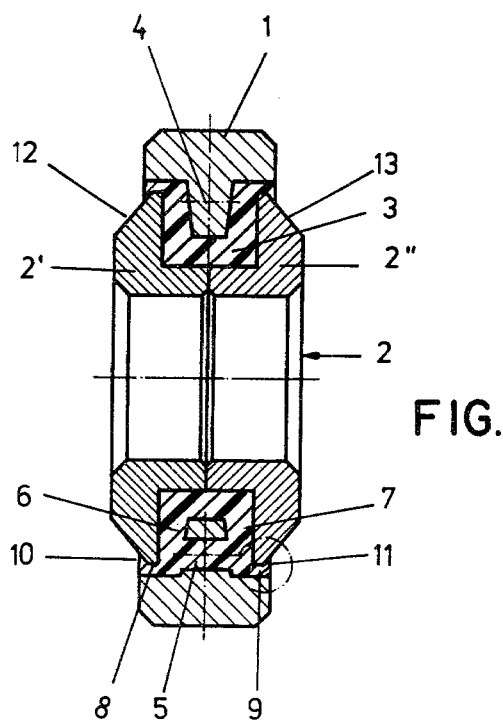
FIG. 1 shows a section of a bearing in which the inner bushing is U-shaped and bipartite.
Figure 1A:
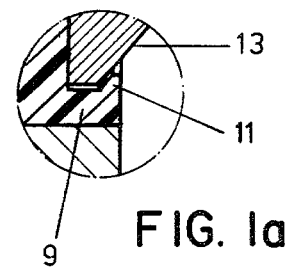
FIG. 1a is an enlarged section of the portion of FIG. 1 within the dash-dotted circle 1.

The bearing of FIG. 1 consists of an outer bushing 1 of T-shaped cross-section, a bipartite inner bushing 2 of substantially U-shaped cross-section, and a likewise U-shaped slide insert 3 of friction-reducing material, for example, synthetic material, arranged between the two bushings 1 and 2. The insert 3 has been formed around the web 4, directed radially inward, of the outer bushing 1, by casting or injection molding, the material of insert 3 interlocking with axial holes 5 provided in the web 4 of outer bushing 1. In this way the insert 3 is circumferentially fixed relative to the outer bushing 1, so that no motion of these two parts can occur relative to each other. To hold the two parts 2' and 2" of the inner bushing 2 together, the insert 3 is provided at the ends of its radially extending legs 6 and 7 with annular projections 8 and 9 directed axially outward, which embrace the circumferential surfaces of the radially extending flanges of the two parts 2' and 2" of the inner bushing. At their free ends, the annular projections 8 and 9 are provided with retaining rims 10 and 11 overlapping the beveled surfaces 12 and 13 of the flanges and thus joining the two bushing parts 2' and 2" into a unit.

In the manufacture of this bearing, first the outer bushing 1 and the two inner bushing parts 2' and 2" are fabricated of steel or other metallic material and finished in known manner. Then the U-shaped insert 3 is applied to the outer bushing. This insert may be prefabricated in a fiberglass-reinforced synthetic material, but alternatively it may be applied to the outer bushing 1 directly by casting or injection molding. Then the two inner bushing parts 2' and 2" are introduced from either side into the outer bushing 1 furnished with insert 3, whereupon the retaining rims 10 and 11 snap over the beveled surfaces 12 and 13 of the inner bushing parts 2' and 2", thus joining these parts to the other parts of the bearing in an integrated unit.

Figure 2:
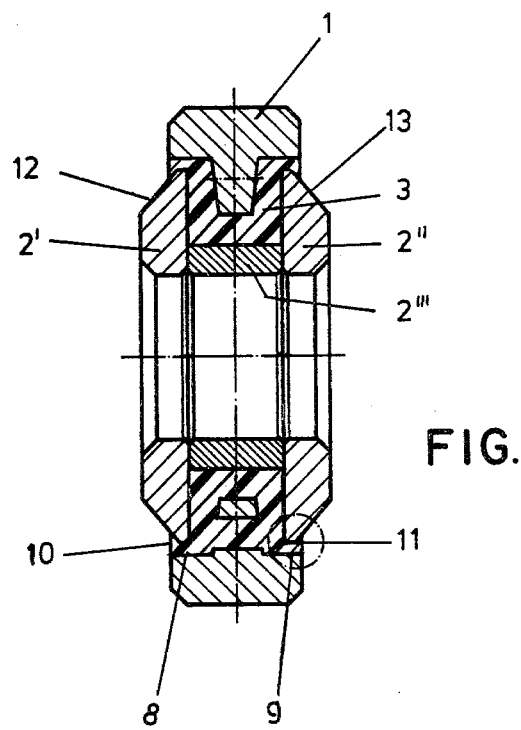
FIG. 2 shows a section of a somewhat modified bearing.
Figure 2A:
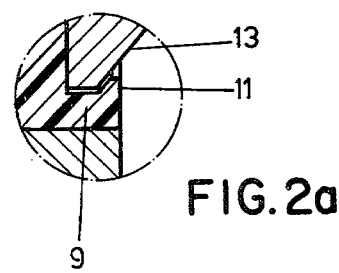
FIG. 2a is an enlarged section of the bearing of FIG. 2 within the circle II.

In the example of FIG. 2, the U-shaped inner bushing is made up of three parts 2', 2" and 2'", the two parts 2' and 2" taking the form of discs and part 2'" the form of a cylindrical sleeve arranged between the two discs. The parts of the inner bushing 2 are held together as before by the retaining rims 10 and 11 provided on the annular projections 8 and 9 of the insert 3, which rims overlap the bevels 12 and 13 of the disc-shaped parts 2' and 2" of the inner bushing 2.

The embodiment of FIG. 3 is in principle a reversal of the bearing of FIG. 2. Here the inner bushing 14 is in one piece and of T-shaped cross-section, and the outer bushing 15 is multipartite and of U-shaped cross-section.

The insert 3 is again U-shaped in cross-section, and embraces the web 16 of the T-shaped inner bushing 14. The outer bushing 15 of U-shaped cross-section is made in three parts, namely two discs 15' and 15" and a cylindrical sleeve 15'". The parts of the outer bushing 15 are held together by the retaining rims 10 and 11 on the annular projections 8 and 9 of the insert 3, overlapping the bevels 12 and 13 of the discs 15' and 15".

The embodiments hereinbefore described are only examples. Modifications in design may readily be made. Thus, the axially extending apertures in the web of the T-shaped bushing need not necessarily be drilled holes, but may be slits. or other apertures instead. Alternatively again, the bore or the periphery of the web may be fashioned like gear teeth.

Instead of connecting the parts of the U-shaped bushing by means of retaining projections provided on the insert, some other mode of connection may alternatively be adopted, as for example, a sheathing sleeve of sheet metal with rolled ends. Thus, for example, in many cases where the parts of one bushing are to be axially fixed by adjoining parts after installation of the bearing, it may suffice to provide merely a sleeveshaped transport retainer to be placed in the bore or on the periphery of the composite multipartite bushing under radial stress and removed at the time of installation of the bearing.

Of course, just as the embodiment of FIG. 3 is in principle a reversal of the embodiment of FIG. 2, the embodiment of FIG. 1 might likewise be reversed; that is, the inner bushing may be T-shaped, and the outer bushing U-shaped and bipartite.

Other variations, modifications, omissions or additions within the spirit and scope of the invention will be apparent to those skilled in the art.

What is claimed is:

1. A bearing for transmitting radial and axial forces, comprising an inner and an outer bushing, one of said bushings being provided with flanges projecting radially to at least partially embrace the other bushing thus fixing the other bushing therebetween, a sliding annular insert having a U-shaped cross-section of antifriction material being arranged between said bushings, and having annular projections extending axially outward to embrace said flanges of said one of said bushings.

2. The bearing of claim 1, wherein said sliding U-shaped insert is rotationally fixed to one of said bushings, said one of said bushings having a subtantially T-shaped cross-section.

3. The bearing of claim 2, wherein the substantially T-shaped bushing includes a web provided with axial apertures interlocking with projections provided on the sliding insert.

4. The bearing of claim 1, wherein said outer bushing is segmented.

5. The bearing of claim 4, wherein said axially extending annular projections are provided with retaining rims overlapping said flanges of said other bushing.

6. The bearing of claim 5, wherein said retaining rims are annular.

* * * * *